Patented Sept. 2, 1947

2,426,917

UNITED STATES PATENT OFFICE 2,426,917

PROCESS FOR PRODUCING POLYSULFIDE RUBBER OF LOW-WATER PERMEABILITY

Naaman F. Barr and Wallace K. Schneider, Pittsburgh, Pa., assignors to Stoner-Mudge, Inc., Pittsburgh, Pa., a corporation of Pennsylvania No Drawing. Application July 25, 1944,
Serial No. 546,573

3 Claims. (Cl. 260—29)

This invention relates to polysulfide synthetic rubber and polysulfide polymers.

As set forth in a number of patents issued to Joseph C. Patrick including 1,890,191, December 6, 1932, and 2,216,044, September 24, 1940, to which reference is made, these polymers may be made by reacting polyfunctional organic compounds with alkaline polysulfides where the functionality is due to the presence of two or more substituents split off by reaction with said polysulfide, chlorine being the typical commercial representative of such functional substituents. The polymers may also be made by the reaction of polymercapto bodies with an agent which supplies oxygen or sulfur in active form and causes polymer formation by the removal of hydrogen and its conversion into water or hydrogen sulfide.

This invention is applicable to polysulfide polymers in general including those identified by the statement that they are polymers of the recurring unit

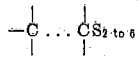

(where these skeleton carbon groups are carbon atoms separated by and joined to intervening structure and adjacent carbon atoms respectively), and copolymers of these units. For convenience we shall throughout the specification and claims employ the term "polyalkylene polysulfide polymer" to mean those polymeric bodies derived from a single polyfunctional recurring unit responsive to the generalized formula recited above or from a mixture of two or more of these. Thus we intend the term "polyalkylene polysulfide polymer" to be descriptive of both polymeric products and copolymeric products having diverse intervening structure in the above generalized formula, a practice which is common in this field.

In the manufacture of these polymers the organic reactant or reactants and the polymerizing reagent are commonly reacted in the presence of an aqueous dispersion medium containing a dispersing or peptizing substance, e. g. magnesium hydroxide, the purpose of which is to maintain the reactants and polymer formed therefrom in a dispersed condition. At the completion of the chemical reaction the product is in the form of a latex which is washed to remove water soluble impurities. From the latex the polysulfide polymer or synthetic rubber may be separated in solid form, e. g., as a coagulum or in the form of granules.

This technique, which is set forth in a number of Patrick patents including those above identified and also Re. 19,207, reissued June 12, 1934, and 1,923,392, August 22, 1934, is applicable to polysulfide polymers in general and is not restricted to polymers having a particular organic structure. By the same token the present invention is likewise applicable to polysulfide polymers in general. The symbolism above set forth is intended to identify a broad class of said genus.

Instead of separating the polymer from the latex and using or selling the separated solid polymer, the latex itself may be made, used and sold as a valuable commodity. It has substantial utility as a film-forming and impregnating material. The residual film or solid polymer left after evaporation of the water is uniquely resistant to hydrocarbon solvents and the latex has many uses revolving about the peculiar ability of the polymer to resist the action of organic solvents particularly hydrocarbon solvents. For example the latexes are valuable as film-formers in the application of coatings or linings for tanks and the like designed to hold various petroleum products including motor and aviation grade gasoline, Diesel engine fuel, crude oil, etc.

This advantage is, however, coupled with a rather serious disadvantage, to wit, poor resistance to the diffusion of water into and through the films. This disadvantage limits the fields of usefulness of the polysulfide polymer latexes.

It has been recognized for a long time that if means could be devised markedly to reduce the water permeability of films deposited from those latexes without affecting the unique resistance of those films to organic solvents, new fields and markets would be opened up. Such an achievement would provide a coating material dispersed in the cheapest known dispersing medium, i. e., water, and yielding a film highly resistant not only to many organic solvents but also to water and aqueous solutions. With such a goal in view, numerous unsuccessful efforts have been made to solve the problem thus presented.

A principal object of the present invention is to provide a satisfactory solution of that problem.

The merits of such an accomplishment will be obvious to those skilled in the art. One instance of that merit relates to the solution of problems arising in the shipping and storage of gasoline and similar petroleum products. While the presently available polysulfide latex coating compositions are satisfactory for lining concrete and wood gasoline storage tanks which are never filled with water, they cannot be employed directly for lining corrosion-susceptible containers, e. g. tankers, aircraft-carrier fuel storage tanks and the like because it is necessary to ballast the empty tanks with water on a return voyage and corrosion is caused by the water which penetrates through the film. Furthermore, the handling of aviation gasoline aboard ship necessitates the use of a water-displacement system for both filling and emptying the tanks to avoid explosion hazards. Accordingly, the present invention possesses the greatest utility in affording tank linings for such applications, where steel or galvanized steel tanks are intermittently exposed to the corrosive action of sea water used for ballasting.

The unsuccessful attempts include the application of palliatives without removing or inactivating the cause. Such expedients include latexes containing substances such as resins, pigments, etc., intended to impart resistance to water penetration but ineffective in accomplishing that purpose.

The present invention goes to the root of the difficulty and strikes at the cause thereof. It has been found that the said cause is (to put the matter one way) the price paid for obtaining the polymer in highly dispersed condition as the discontinuous phase in a system in which water is the continuous phase, i. e., the cause appears to reside in the dispersing or peptizing agent, which remains in the film deposited from the latex by volatilization of the water. This is a hydrophilic substance commonly a gelatinous insoluble or slightly soluble metallic compound, e. g., a hydroxide of calcium, magnesium, strontium, aluminum, chromium, iron, etc.

In accordance with the invention, the latex is treated with a preformed water-soluble reagent (hereinafter more specifically described) the effect of which is to greatly reduce the permeability of the film deposited from the latex by evaporation of the aqueous dispersing medium.

A satisfactory explanation or theory to account for the phenomena observed and obtained cannot be offered at the present time nor is any such theory necessary in order to practice the invention. It is important, however, to note certain facts which are useful in obtaining the maximum benefit from the invention and which throw some light on the nature of the observed phenomena.

The added reagent is a water soluble ammonium compound. It forms a stable water soluble complex with the gelatinous metallic compound. After adding the reagent, the latex may be washed until most of said complex and compound is removed as shown by the very low ash value of the washed latex. This effect cannot be obtained by washing the untreated latex. Moreover the reagent has the noteworthy property of accomplishing its valuable results without precipitating, coagulating, hydrolyzing, decomposing or otherwise adversely affecting the latex or the particles of polymer dispersed therein. The character of the film is greatly improved in respect of its resistance to water penetration and passage or permeability without in any way impairing the other valuable properties including impermeability and resistance to organic solvents and the latex is improved in respect of its normal film-forming properties.

The finding that the cause of low water permeability resides in the presence of the gelatinous metallic compound plus the discovery of means to render those compounds soluble and capable of removal by washing would lead to the normal conclusion that the lowest permeability would be attained by adding the reagent and then thoroughly washing. That however is not the case, i. e. latexes which have been treated and not washed have a lower permeability than those treated and washed although the latter have a permeability greatly superior to i. e., lower than, untreated latexes.

The following data illustrate this unexpected and unique behavior:

Permeability to water
(a) Untreated latex B_____ 308
(b) Treated with 2% NH4NO3_____ 129
(c) Same as (b), washed 1 time_____ 136
(d) Same as (b), washed 5 times_____ 170

It thus appears that the function of the complex-forming additive ammonium compound is not simply to solubilize the cation of the original gelatinous hydroxide but rather to effect an actual inactivation or neutralization.

We therefore arrive at the phenomenon that the addition of a water-soluble substance to the latex and the consequent conversion of the gelatinous metallic compound into a soluble complex confers water impermeability to the films obtained from the latex and more effectively when the added reagent is retained than when it and its reaction products are washed out.

This offers the apparent paradox that the solubilization of the dispersing agent and the retention of the reaction product of the dispersing agent and the solubilizing reagent in the latex, instead of making the films more permeable, decrease the permeability.

Since it is usually desirable to wash the latex product, obtained in the manufacture of polysulfide polymers, to remove the water soluble substances, e. g., sodium chloride, obtained as a by-product, the preferred procedure is to wash the latex in the normal manner then add the reagent and cause it to remain in the latex. The invention may be applied to the latex as a part of the manufacturing process or after the latex has been manufactured and stored or shipped. It is preferred to apply the invention as a part of the manufacturing process.

As above stated, magnesium hydroxide is commonly employed as a dispersing agent. In accordance with the principle of this invention, the added inactivating reagent is one which forms a stable soluble complex with the magnesium ion at the pH of the latex usually about 8 to 10. The class of said reagent disclosed and claimed in this application is water soluble, ionizable ammonium compounds in general. To illustrate this class without limitation to any particular ammonium compound there may be mentioned ammonium hydroxide and ammonium salts, e. g., formate, carbonate, acetate, propionate, butyrate, valerate, caproate, oxalate, malonate, succinate, tartrate, citrate, chloride, nitrate, sulphate, bromide, iodide, borate, and the various ammonium phosphates, and numerous others.

We have found that as little as 1 per cent of inactivating reagent based on the weight of the polysulfide polymer is effective; there appears to be an advantage, however, in employing larger amounts, up to about 10 per cent. This concentration is many times the known residual concentration of magnesium hydroxide in the latex (determined by ash analysis) and indicates that complex formation does not go as rapidly and completely as would be expected of a simple metathesis. We suspect that the presence of the organic polymeric material has an interfering action, a characteristic of many colloidal systems.

In general we prefer to employ from about 2 to about 5 per cent by weight of the ammonium compound based on the weight of the polysulfide polymer in the said latex. We have found that the treated latexes are ready for use in as short a time as one hour following the addition of the ammonium compound. We generally prefer to allow an over-night contact time of about 16 hours before proceeding with application of the treated latex as a tank lining composition or for other coating purposes.

The beneficial effect of the invention is most conclusively demonstrated by comparing the specific water permeabilities of coalesced films from treated and untreated latex. For this purpose we employ a testing technique which is a modification of the familiar Wray-Van Horst free film diffusion cell method. The test specimen is prepared by spreading multiple coats of the aqueous latex on one side of 16 ply, Ionic blank white poster cardboard, a highly calendered stock approximately 50 mils thick. After the so built-up latex film has coalesced and thoroughly dried, circular discs are cut to fit snugly into the inside of the retaining band of a "Seal-All Mason" jar lid. The coated side faces the liquid content of the ½ pint screw-top Mason jar which is employed to contain the test liquid—either water, aviation gasoline, or other particular liquid to which the permeability is to be measured. After introducing 152 ml. of the selected liquid the retaining band carrying the coated cardboard disc is screwed on tightly and the test assembly is placed in a constant temperature, controlled humidity room operating at 70° F. and 65% R. H. for three days. At the end of this time the first weighing is made, and subsequent weighings are made at daily intervals for 10 days, or until a steady-state loss of weight is obtained.

The permeability is calculated as follows:

$$\text{Permeability} = \frac{\text{mgms. wt. loss per day} \times \text{measured film thickness (mils)}}{\text{area of coated disc (square inches)} \times 20}$$

It will be noted that this gives a permeability rate based on a 20 mil thick film—a figure approximating that at which polysulfide synthetic rubber latex films are normally employed in lining tanks.

Inasmuch as uncoated cardboard controls pass about 2500 mgms. of water and more than 10,000 mgms. of aviation gasoline per day, the presence of the cardboard support does not significantly interfere with transfer rates calculated as though a free film were being used.

The following specific examples will serve to illustrate the principles of the invention as defined in the claims. All of the percentage figures recited are on a weight basis.

*Example 1*

A washed latex derived from reaction between 3 parts of ethylene dichloride, 1 part of propylene dichloride and an excess of sodium polysulfide, formed in the presence of magnesium hydroxide in the manner fully described in Example 1 of United States Patent 2,216,044, for example, and having a pH of about 8 to 10 was divided, and a portion treated with 2% of ammonium nitrate based on the solids content of polysulfide-type synthetic rubber. The latter sample was then washed by decantation before use. The samples were filmed on Ionic cardboard and allowed to coalesce in the usual manner. Permeabilities to water and to aviation gasoline were determined with the following results:

| | Permeability to— | |
|---|---|---|
| | Water | Aviation Gasoline |
| Untreated sample | 188.0 | 7.0 |
| Treated with 2% NH₄NO₃ | 64.8 | 7.6 |

The marked reduction in water permeability, with no accompanying change in the gasoline permeability, is self-evident.

*Example 2*

The same treated and untreated latexes described in Example 1 were pigmented with 20% (by weight) of calcium titanate, and permeabilities on the coalesced films determined in the usual manner. The data follow:

| | Permeability to— | |
|---|---|---|
| | Water | Aviation Gasoline |
| Untreated pigmented sample | 243.0 | 9.5 |
| Treated with 2% NH₄NO₃ | 71.6 | 8.8 |

The beneficial effect of the treatment is obvious, even on the highly pigmented latexes.

*Example 3*

A washed latex derived from reaction between dichlor diethyl formal and sodium tetrasulfide in the presence of magnesium hydroxide, as described in United States Patent 2,216,044 was first stripped of side-chain sulfur by the method disclosed in United States Patent 2,282,287. A sample of the resulting latex product washed until substantially free from soluble impurities and having a pH of about 8 to 10 was treated with 1.2% ammonium chloride without subsequent washing and then filmed in the usual manner. Permeability data follow:

| | Permeability to— | |
|---|---|---|
| | Water | Aviation Gasoline |
| Untreated sample | 202.0 | 12.1 |
| Treated with 1.2% NH₄Cl | 4.6 | 13.6 |

The remarkable improvement in water permeability rate which resulted from the treatment unaccompanied by washing after addition of the reagent is strikingly evident.

In the above example water soluble ionizable ammonium compounds in general may be substituted for the specific ammonium compounds therein set forth.

What is claimed is:

1. The process of treating an aqueous dispersion of a polyalkylene polysulfide which is a polymer of the unit

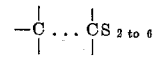

to reduce the permeability to water of films obtained therefrom, said dispersion containing magnesium hydroxide as dispersing agent and having a pH of 8 to 10 and having been washed with water until substantially free from water soluble impurities, which comprises incorporating with said dispersion after the washing a preformed water soluble ionizable ammonium compound, the proportion of said ammonium compound being 1 to 10 percent by weight of said polymer in said dispersion, whereby a stable water soluble complex with the magnesium cation is formed, the pH remaining within the pH range of the dispersion usually 8 to 10.

2. The process of claim 1 in which the weight percent of added preformed water soluble ionizable ammonium compound lies between 2 and 5 percent.

3. The process of claim 1 in which the said added ammonium compound is ammonium chloride.

NAAMAN F. BARR.
WALLACE K. SCHNEIDER.

REFERENCES CITED

The following references are of record in the file of this patent:

UNITED STATES PATENTS

| Number | Name | Date |
|---|---|---|
| 2,257,607 | Jage | Sept. 30, 1941 |